US006352287B2

(12) United States Patent
Casagrande

(10) Patent No.: US 6,352,287 B2
(45) Date of Patent: Mar. 5, 2002

(54) APPARATUS AND METHOD FOR IMPROVED PATCH FOR BUSINESS FORMS WITH INTEGRATED CARDS

(75) Inventor: Charles L. Casagrande, Batavia, IL (US)

(73) Assignee: Strata-Tac, Inc., Batavia, IL (US)

(*) Notice: Subject to any disclaimer, the term of this patent is extended or adjusted under 35 U.S.C. 154(b) by 0 days.

(21) Appl. No.: 09/849,906

(22) Filed: May 4, 2001

Related U.S. Application Data

(63) Continuation of application No. 09/203,733, filed on Dec. 2, 1998, now abandoned.
(60) Provisional application No. 60/067,133, filed on Dec. 2, 1997.

(51) Int. Cl.$^{7}$ .......................... B32B 31/04; B32B 31/12
(52) U.S. Cl. ............................ 283/81; 283/61; 283/62; 283/72; 283/79; 283/80; 283/94; 283/98; 283/100; 283/101; 283/105; 283/107; 283/108; 283/109; 40/638; 428/13; 428/40; 428/42; 428/43; 428/195; 428/914
(58) Field of Search ............................. 283/79, 61, 80, 283/62, 81, 72, 94, 98, 100, 101, 105, 107, 108, 109; 40/638; 428/13, 40, 42, 43, 195, 914

(56) References Cited

U.S. PATENT DOCUMENTS

| | | | |
|---|---|---|---|
| 2,255,019 A | 9/1941 | Wolters et al. | 156/268 |
| 2,896,351 A | 7/1959 | Johnson | 40/702 |
| 3,166,186 A | 1/1965 | Karn | 428/42.3 |
| 3,252,234 A | 5/1966 | Goodman | 40/638 |
| 3,420,364 A | 1/1969 | Kennedy | 206/460 |
| 3,996,679 A | 12/1976 | Warneke | 40/1.5 |
| 4,248,919 A | 2/1981 | Davis | 428/40 |
| 4,479,838 A | 10/1984 | Dunsirn et al. | 156/247 |
| 4,508,365 A | 4/1985 | Hawes | 281/2 |
| 4,523,825 A | 6/1985 | Norris | 354/301 |
| 4,544,590 A | 10/1985 | Egan | 428/40 |
| 4,664,982 A | 5/1987 | Genovese et al. | 428/447 |

(List continued on next page.)

FOREIGN PATENT DOCUMENTS

| | | | |
|---|---|---|---|
| CA | 1274979 | 10/1990 | C09F/3/04 |
| DE | 4107469 | 9/1992 | B65D/73/00 |
| EP | 0613792 | 9/1994 | B42D/5/02 |
| FR | 2 691675 | 12/1993 | B42D/15/10 |
| GB | 2209993 | 6/1989 | B32B/7/06 |
| JP | 58 025 379 | 2/1983 | C09J/7/02 |
| JP | 1214485 | 8/1989 | B42D/15/02 |
| JP | 1285390 | 11/1989 | B42D/15/02 |
| JP | 2121896 | 5/1990 | B42D/15/04 |
| WO | WO 90/11194 | 10/1990 | B42D/15/02 |
| WO | 92/05036 | 2/1992 | B42D/15/00 |

*Primary Examiner*—Willmon Fridie, Jr.
*Assistant Examiner*—Mark T. Henderson
(74) *Attorney, Agent, or Firm*—Thompson Coburn LLP; Grant D. Kang; Robert C. Haldiman

(57) ABSTRACT

A planar form or structure is used to create a thin card capable of receiving and retaining printed indicia, including written signatures, on both opposing surfaces. The structure and related method allow the exposed carrier surface and the underlying release agent layer to receive and retain printed indicia, including written signatures, while retaining an extremely thin, yet tear-resistant, card structure. The release agent layer solidifies from a liquid to form a film capable of receiving and retaining printed indicia, written signatures, and the like which may be printed or written upon through the peeling away of the transparent lamina layer to expose the underlying release agent layer for receiving the indicia. The resulting structure preferably exhibits a flexibility due to its thickness lying within the range of 15–30 microns plus the thickness of the carrier.

11 Claims, 2 Drawing Sheets

U.S. PATENT DOCUMENTS

| | | | | | |
|---|---|---|---|---|---|
| 4,742,954 | A | | 5/1988 | Shishido | 229/92.8 |
| 4,837,088 | A | * | 6/1989 | Freedman | 428/914 |
| 4,863,772 | A | | 9/1989 | Cross | 428/40 |
| 4,868,152 | A | * | 9/1989 | Foulds et al. | 428/914 |
| 4,890,862 | A | | 1/1990 | Buchholz | 283/62 |
| 4,910,058 | A | | 3/1990 | Jameson | 428/42 |
| 4,925,716 | A | | 5/1990 | Haas | 428/41 |
| 5,002,312 | A | * | 3/1991 | Phillips et al. | 283/72 |
| 5,007,191 | A | * | 4/1991 | Klein | 40/638 |
| 5,039,652 | A | | 8/1991 | Doll et al. | 503/206 |
| 5,042,842 | A | | 8/1991 | Green et al. | 283/101 |
| 5,049,443 | A | | 9/1991 | Kuszaj et al. | 428/332 |
| 5,129,682 | A | | 7/1992 | Ashby | 283/81 |
| 5,131,686 | A | | 7/1992 | Carlson | 283/75 |
| 5,172,938 | A | | 12/1992 | Schmidt | 283/109 |
| 5,209,514 | A | | 5/1993 | Hebert | 283/81 |
| 5,219,183 | A | | 6/1993 | McKillip | 283/62 |
| 5,271,787 | A | | 12/1993 | Hoffman et al. | 156/268 |
| 5,318,326 | A | | 6/1994 | Garrison | 283/101 |
| 5,320,387 | A | | 6/1994 | Carlson | 283/75 |
| 5,328,538 | A | | 7/1994 | Garrison | 156/249 |
| 5,362,106 | A | | 11/1994 | Longtin | 283/109 |
| 5,413,532 | A | | 5/1995 | Raby | 462/2 |
| 5,439,255 | A | | 8/1995 | McIntire et al. | 283/62 |
| 5,462,488 | A | | 10/1995 | McKillip | 462/26 |
| 5,466,013 | A | | 11/1995 | Garrison | 283/107 |
| 5,580,640 | A | * | 12/1996 | Kraft et al. | 428/914 |
| 5,589,025 | A | | 12/1996 | Garrison | 156/268 |
| 5,653,473 | A | * | 8/1997 | Laszutko et al. | 283/81 |
| 5,660,896 | A | | 8/1997 | Normand et al. | 428/13 |
| 5,704,650 | A | * | 1/1998 | Laurash et al. | 283/81 |
| 5,736,212 | A | | 4/1998 | Fischer | 428/42.2 |
| 5,916,665 | A | | 6/1999 | Fischer et al. | 428/195 |
| 6,190,747 | B1 | | 2/2001 | Fischer | 428/42.2 |
| 6,217,078 | B1 | * | 4/2001 | Roth et al. | 283/81 |

* cited by examiner

APPARATUS AND METHOD FOR IMPROVED PATCH FOR BUSINESS FORMS WITH INTEGRATED CARDS

CROSS-REFERENCE TO RELATED APPLICATIONS

This is a continuation of U.S. application Ser. No. 09/203/733 filed Dec. 2, 1998, now abandoned, which claims priority to Ser. No. 60/067,133 filed Dec. 2, 1997.

STATEMENT REGARDING FEDERALLY SPONSORED RESEARCH OR DEVELOPMENT

None.

BACKGROUND OF THE INVENTION

This invention relates to an improved patch for business forms with integrated cards. It is quite common for businesses to use business forms which incorporate membership cards or other kinds of cards requiring the signature of the user, or other user indicia, to be added at the time of issuance. The part of the business form which houses the integrated card may be referred to as a patch. Patches traditionally consist of several layers of adhesive, transparent film and other chemical agents. In the business form industry, several problems continue to exist with the present state of the art of the patches utilized.

One major problem relates to the thickness of the patch. In many instances, the patch is so thick that laser printers cannot be used to print on the card. In addition, many of the patches have inconsistent release problems. In other words, end-users often have difficulty removing and/or detaching the card from the business form. Also, other techniques for making patches result in curling of the patches. Moreover, a recurring problem occurs with the use of pattern or dry edge glue application. To facilitate the removal of the card from the patch, adhesive is often applied in patterns, or alternatively, not applied near the edge of the patch. The disadvantage is the adhesive pattern often unattractively appears through the back of the card, after it has been removed from the business form. Finally, many of the existing patches result in a card that cannot be signed.

SUMMARY OF THE INVENTION

The present invention solves many of the problems presently faced by the business form industry by using a lamina-release agent and a thin bottom lamina, which results in a thin patch, easily and consistently released, without curling problems, and does not require pattern or dry edge adhesive application. Being relatively thin, the present invention works in more intricate paper path laser printers and can be produced much more economically than other patches in the industry. In addition, the present invention uses a film that may be manually signed by writing directly onto the film, or printed on using laser printing techniques.

One of the main advantages of the present invention stems from the lamina-release agent. The lamina-release agent is applied in liquid form, as a coating, but later solidifies into a film. The lamina-release agent may be composed of clear polyurethane, acrylic urethane, or any other substance which can be cured from liquid to solid and which performs substantially the same as the clear polyurethane, or the acrylic urethane, films. The use of a lamina-release agent has three purposes: it acts as the plastic laminate that remains on the back of the card; it acts as a dry release agent and detaches from the lamina; and its thickness results in obtaining a signable surface. Thus, by using a lamina-release agent which functions both as a release and lamina, a minimal card thickness is obtained which was not possible with previous patches. Previously, patches use two layers to perform what the present invention does in a single layer.

Another advantage of the present invention is that the clear lamina, which may be a polyester film, at the bottom of the patch is relatively thin and pliable, being only 25 microns thick. Because of its minimal thickness, pattern and dry edge adhesive application is unnecessary. End-users can easily remove the card due to the large difference in stiffness between the upper layers and the bottom layer.

In a first preferred embodiment, the lamina with release agent layer and the permanent adhesive layer may not be necessary if the adhesive is machine applied as part of a manufacturing process.

In a second preferred embodiment, the bottom layer may be composed of any material which cures with the lamina-release agent on top of the bottom layer.

In a third preferred embodiment, in the manufacturing process, a portion of the bottom layer may be removed to expose part of the lamina-release agent. The portion may be removed by means of a dual slit across the width of the patch before the card is adhered to a business form. This permits imaging and duplex printing directly into the lamina-release agent.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

Figure 1:
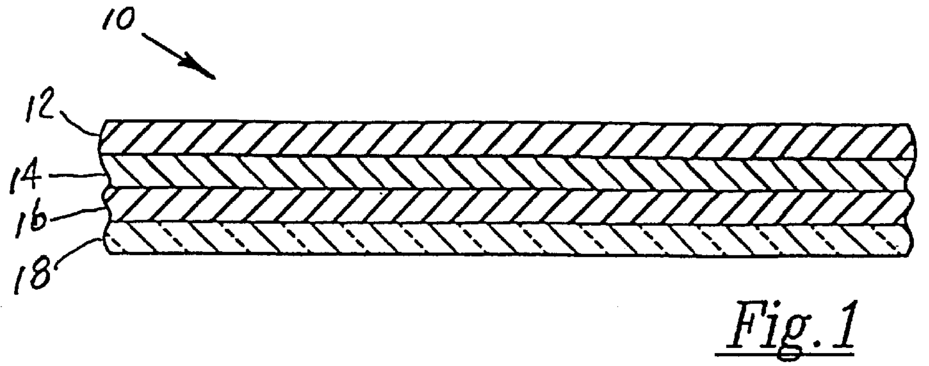
FIG. 1 is a cross-sectional view of the patch showing the several layers of the patch.

Referring now to the drawings in detail, where like numerals refer to like parts or elements, there is shown in FIG. 1 a patch 10 initially comprised of the following four layers: a lamina with release agent 12, a permanent adhesive 14, a lamina-release agent 16, and a clear lamina 18. The layers are stacked with the lamina with release agent 12 being the top layer and the clear lamina 18 being the bottom layer. When the patch is manufactured, the lamina with release agent 12 is used to segregate the permanent adhesive 14 from the other layers of material when rolled and is peeled away during the manufacturing process, exposing the permanent adhesive layer 14 for bonding to the intended surface.

Figure 2:
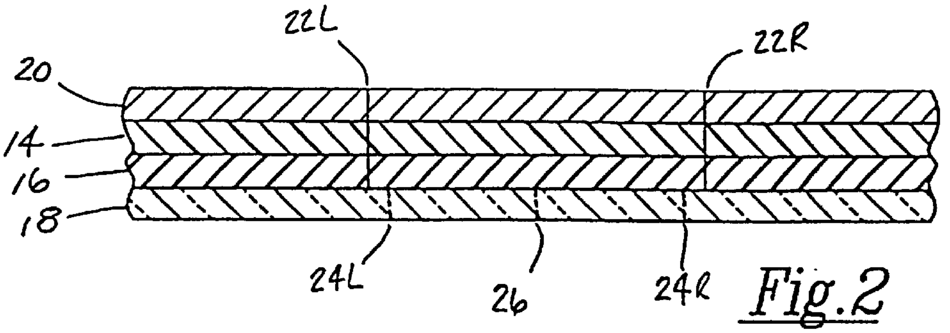
FIG. 2 is a cross-sectional view of the patch of FIG. 1 showing the layers of the patch.

Once the lamina with release agent 12 is removed, the three remaining layers, 14, 16 and 18, act as a single unit and are adhered, for example, to the bottom of a paper business form 20. As shown in FIG. 2, the patch then consists of four layers: a paper business form 20, a permanent adhesive 14, a lamina-release agent 16, and a clear lamina 18. The first three layers are then die cut at 22L and 22R in FIG. 2, through to the bottom of the lamina-release agent 16. Related, opposed, parallel die cuts (not shown) are simultaneously cut into the patch 10 so as to form the desired geometric shape; in this case a rectangle with rounded corners to form the card C. The clear lamina 18 is not cut and is left attached to the bottom of the business form patch 20.

Figure 3:
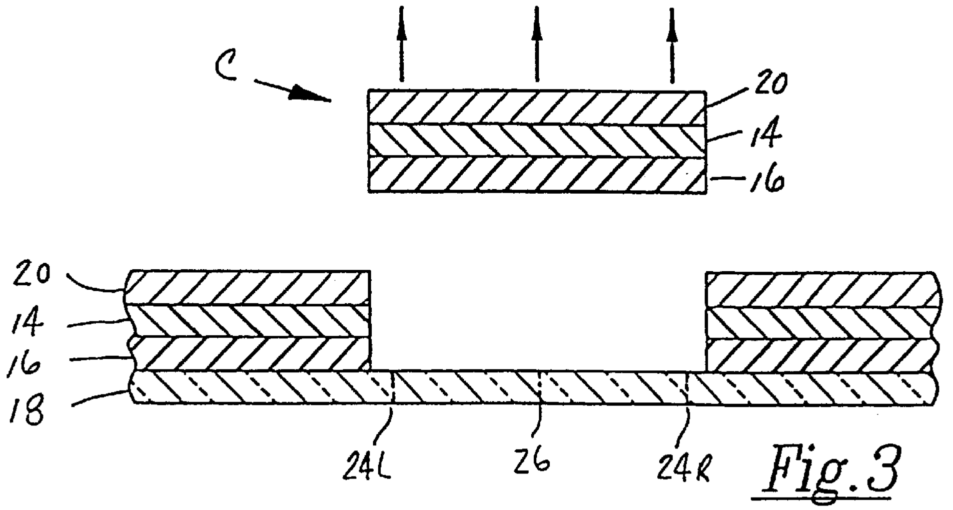
FIG. 3 is a cross-sectional view of the patch of FIGS. 1 and 2 showing the removal of the card from the patch structure.

As is shown in FIG. 3, once the business form 20, i.e. the business form 20 with integrated card C, is die cut the pre-determined location for printing on the upperside or face of the card 20 is clearly shown. To facilitate printing or the addition of other elements to the underside of the card C, slits 24L, 24R may be added to the clear lamina 18 along the bottom of the patch 10. In order that the card C does not detach from the business form 28, a center slit 26 and corresponding opposing slits (not shown) are also placed in the clear lamina layer 18 so that approximately one-half of the card C may be exposed for the purposes of printing information or other indicia of use concerning the end-user prior to affixing a signature or other personal indicia to the card C. Each of these slits 24L, 24R, 26 may be either die cut or perforated so that the bottom side of card C can be exposed to the desired amounts. It should be noted that the slits 24L, 24R and 26 are positioned inward of the die cuts 22L, 22R so that the card C is not inadvertently dislodged from the business form 28 prior to the time when such disengagement is intended.

Referring again to FIG. 3, the integrated card C may be disengaged from the business form 28 by pushing upward from the bottom of the patch 10 (against the clear lamina layer 18) so that the card C is disengaged with paper layer 20, permanent adhesive layer 14 and lamina-release agent 16 integrated as a single unit, integrated card C. Integrated card C has a preferred thickness dimension of not more than 25 microns plus the thickness of the paper business form 20 to which the patch 10 is attached. Thus, the extremely thin dry lift integrated card [C] system which is described exhibits the characteristics of being extremely flexible, thin, but with significant resistance to tearing.

Figure 5:
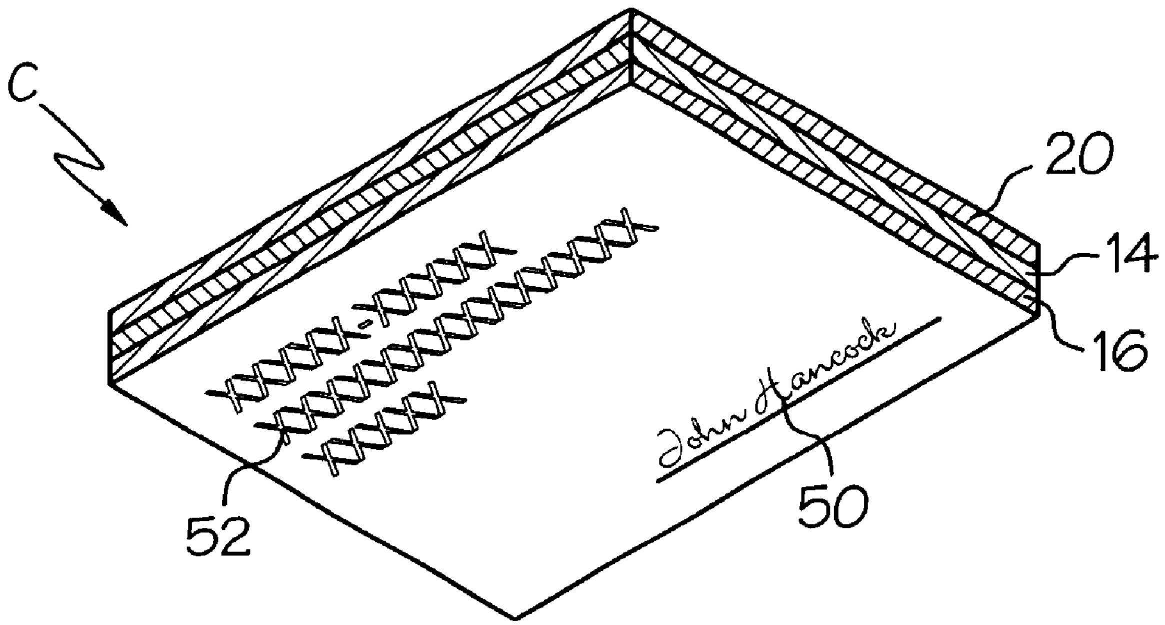
FIG. 5 is a perspective view of an integrated card after separation.

It is presently preferred that the lamina with release agent layer 12 be made of a silicon so as to act as a liner separating the remaining layers from the underlying clear lamina layer 18 when rolled for storage. The permanent adhesive layer 14 may be manufactured from any adhesive product presently known or later discovered which will create a permanent adhesion between the layers below (see FIGS. 1 and 2) and the business form (card) layer of FIG. 2. The lamina release agent 16 may be comprised of a coating of clear varnish polyurethane which has a preferred thickness of 0.75 mils, but may range between 0.5 and 1 mil. Other substances which have been found satisfactory for use as the lamina release agent 16 are acrylic urethanes and other compounds which exhibit similar properties of being liquid when applied as a coating and curing into a solid film after drying. The clear lamina layer 18 may be a clear polyester film having a nominal thickness of 1 mil so that there is no need to apply an additional layer of patterned or dry edge adhesive to keep the card in position within the business form 28. The integrated card C is readily disengagable from the business form 28 as it will pop out easily due to the significant difference in stiffness from the integrated card unit consisting of the top three layers 20, 14 and 16 in contrast to the bottom layer 18 comprised of the extremely thin polyester film baseliner. Another significant feature of the integrated card C is that, in, addition to the dry release characteristics of the polyurethane coating (layer 16), that layer (which is exposed when disengaged from the business form 28), provides a surface which is not only signature compatible, 52, but which will also accept printed indicia of the end user (52). See FIG. 5.

Figure 4:
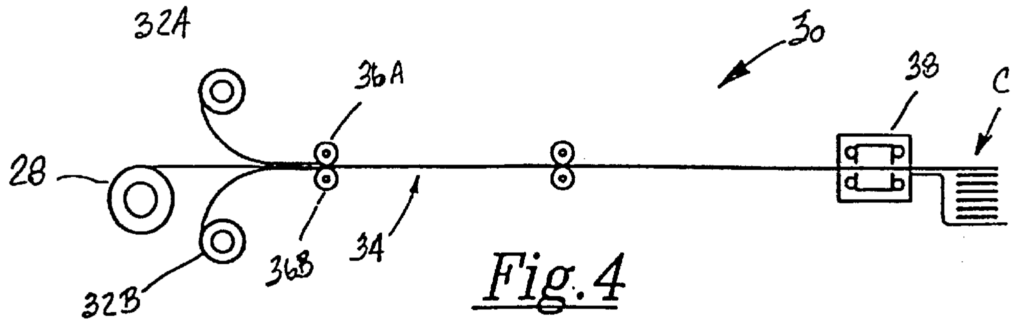
FIG. 4 is a diagrammatic view of the manufacturing process for attaching the patch to a business form.

The present invention may be manufactured by feeding rolled business forms 28 into a manufacturing line 30. The forms 28 may be fed into the line 30 so that the underside (or reverse side) of the form 28 is either inverted or right side up to match the placement of the patch 10 on that side. The patch material 10 is fed into the line from a large roll 32A or 32B located above or below the business form web, respectively, so that the patch 10 will be positioned juxtaposed the bottom side of the business form. The patch material 10 is then directed along the web 34 so as to come into contact with a vacuum/cutting unit 36A or 36B (located, respectively, above or below the web and adjacent the patch material) which peels off the lamina with release agent 12, cuts the patch material 10 into appropriate dimensions, and presses (so as to adhere) the patch material 10 to the business forms 28 at pre-determined locations. One or more patches 10 may be adhered to the business form 28 in pre-determined locations as desired by the end-user. Next, the corporate business forms 28 continue to travel along the web 34 until reaching a die cutting station 38 which die cuts from the respective side of the business form through the business form 20, the permanent adhesive layer 14, and the lamina-release agent 16. As the completed business forms with integrated cards C leave the line 30, they may be rolled, folded or cut and sheeted for storage. The diagrammatic representation of FIG. 4 shows a cut sheet business form (with integrated card C) stack to be bundled for later use.

When end-users receive a business form with one or more integrated cards C, they may easily remove each integrated card C by peeling it away from the form 28. The end-users may also manually sign, print or write on the bottom of the card as described above. The indicia which may be added to personalize the integrated card C, by adding printed and manually applied end-user information, may be selected from the group of indicia types including end-user name, address, signature, identification numbering, bar-code numbering, company logo and holographic images.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

I claim:

1. A planar structure with indicia thereon, the planar structure comprising:

at least four layers secured in overlying relation to each other and arranged from top to bottom including: a carrier having a pair of opposing, planar surfaces for carrying indicia thereon, an adhesive layer, a release agent layer, and a transparent lamina;

said release agent layer comprising a solidified liquid release agent, said release agent layer being printable on an exposed surface of said release agent layer;

the planar structure further comprising a multi-layer unit which includes the carrier, the adhesive layer, and the release layer;

wherein the planar structure is formed by manipulating the multi-layer unit from an initial position by separating the release agent layer from the underlying transparent lamina layer to release the multi-layer unit from a remainder portion;

whereby said exposed surface of said release agent layer becomes exposed such that said exposed surface is printable when said multi-layer unit is separated from the remainder portion.

2. The structure of claim 1, further comprising additional slits and ties contained in the transparent lamina, said slits and ties being within a perimeter of said multiple-ply unit and said slits and ties providing access to the release agent layer to receive printed indicia prior to and after separation from the remainder position.

3. An information carrying structure having a separable information carrying card comprising:

a paper layer having a top side for carrying information and a bottom side for carrying information;

an adhesive layer in adhesive contact with the bottom side of said paper layer, said adhesive layer being transparent;

a release agent layer having a top side in adhesive contact with said adhesive layer and a bottom side, said release agent layer being transparent and said release agent layer being printable on the bottom side upon exposure of the bottom side of said release agent layer;

a transparent lamina layer having a top side in releasable union with the bottom side of said release agent layer, and said transparent lamina layer having a bottom side; and die cuts circumscribing an information carrying card, said die cuts extending through said paper layer and said adhesive layer and said release layer but not through said transparent lamina layer, such that an end user may separate the union between said release agent layer and said transparent lamina layer to remove a card defined by said die cuts from said information carrying structure.

4. An information carrying structure having a separable information carrying card of claim 3 wherein said transparent lamina layer includes openings exposing the release agent layer for receiving application of information on the bottom side of said release agent layer before separation of the union between said release agent layer and said transparent lamina layer.

5. The information carrying structure having a separable information carrying card of claim 3 wherein said adhesive layer and said release agent layer have a combined thickness between 15–30 microns.

6. The information carrying structure having a separable information carrying card of claim 3 wherein said lamina release agent layer has a thickness between 0.1 mil and 1 mil.

7. The information carrying structure having a separable information carrying card of claim 3 wherein said release agent is thicker than said transparent lamina layer.

8. The information carrying structure having a separable information carrying card of claim 3 wherein said release agent layer is made from material selected of the group consisting of varnish polyurethane and acrylic urethane.

9. The information carrying structure having a separable information carrying card of claim 3 wherein said transparent lamina layer is polyester.

10. The information carrying structure having a separable information carrying card of claim 4 wherein information received on said release agent layer is selected from the group consisting of end user name, address and signature, identification numbering, bar code numbering, company logo and holographic images.

11. An information carrying structure having a separable information carrying card comprising:

a paper layer having a top side for carrying information and a bottom side for carrying information;

an adhesive layer in adhesive contact with the bottom side of said paper layer, said adhesive layer being transparent;

a release agent layer having a top side in adhesive contact with said adhesive layer and a bottom side, said release agent layer being transparent and said release agent layer being printable on the bottom side upon exposure of the bottom side of said release agent layer;

a transparent lamina layer having a top side in releasable union with the bottom side of said release agent layer, and said transparent lamina layer having a bottom side; and said transparent lamina layer being less stiff than a combination of said release agent layer, said adhesive layer and said paper layer; and die cuts circumscribing an information caring card, said die cuts extending through said paper layer and said adhesive layer and said release layer but not through said transparent lamina layer, such that an end user may separate the union between said release agent layer and said transparent lamina layer to remove a card defined by said die cuts from said information carrying structure.

* * * * *

UNITED STATES PATENT AND TRADEMARK OFFICE
CERTIFICATE OF CORRECTION

PATENT NO. : 6,352,287 B2
DATED : March 5, 2002
INVENTOR(S) : Charles L. Casagrande It is certified that error appears in the above-identified patent and that said Letters Patent is hereby corrected as shown below:

Column 6,
Line 45 "caring" should be -- carrying --.

Signed and Sealed this

Twenty-third Day of April, 2002

*Attest:*

JAMES E. ROGAN

*Attesting Officer*

*Director of the United States Patent and Trademark Office*

UNITED STATES PATENT AND TRADEMARK OFFICE
CERTIFICATE OF CORRECTION

PATENT NO. : 6,352,287
DATED : March 5, 2002
INVENTOR(S) : Charles L. Casagrande It is certified that error appears in the above-identified patent and that said Letters Patent is hereby corrected as shown below:

Column 6,
Line 45, "caring" should be -- carrying --.

Signed and Sealed this

Twenty-first Day of May, 2002

Attest:

JAMES E. ROGAN
*Director of the United States Patent and Trademark Office*

*Attesting Officer*